United States Patent

[11] 3,603,105

| [72] | Inventor | Rubin Figa |
| | | Mamaroneck, N.Y. |
| [21] | Appl. No. | 858,754 |
| [22] | Filed | Sept. 17, 1969 |
| [45] | Patented | Sept. 7, 1971 |
| [73] | Assignee | Adelphi Mobile Air Conditioners, Inc. |
| | | Brooklyn, N.Y. |

[54] REFRIGERATION APPARATUS FOR AUTOMOTIVE VEHICLES
9 Claims, 5 Drawing Figs.

[52] U.S. Cl. ........................................... 62/230,
62/133, 62/215, 62/243
[51] Int. Cl. ........................................... F25b 1/00
[50] Field of Search ........................................... 62/133,
230, 215, 226, 228, 259 RC, 243, 244

[56] References Cited
UNITED STATES PATENTS

| 2,794,330 | 6/1957 | Dunn | 62/230 |
| 2,097,857 | 11/1937 | Ferris | 62/242 |
| 2,888,810 | 6/1959 | Hann | 62/215 |
| 3,315,488 | 4/1967 | Lind | 62/241 |
| 3,415,073 | 12/1968 | Ammons | 62/259 |

*Primary Examiner*—William J. Wye
*Attorney*—Delio and Montgomery

ABSTRACT: A refrigeration apparatus for motor vehicles which is powered by the motive power of said vehicle including a compressor, condenser and evaporator connected by appropriate conduit means. The compressor is driven by a constant displacement hydraulic motor which is activated by fluid supplied to it by a variable speed hydraulic pump. The fluid flow rate output of the hydraulic pump is maintained at a substantially constant level by positioning a valve and bypass means between the input and output sides of the hydraulic pump such that when the fluid pressure at the outlet side of the pump exceeds a certain predetermined value, the valve and bypass means opens progressively to allow excess fluid to pass back to the inlet side of the pump.

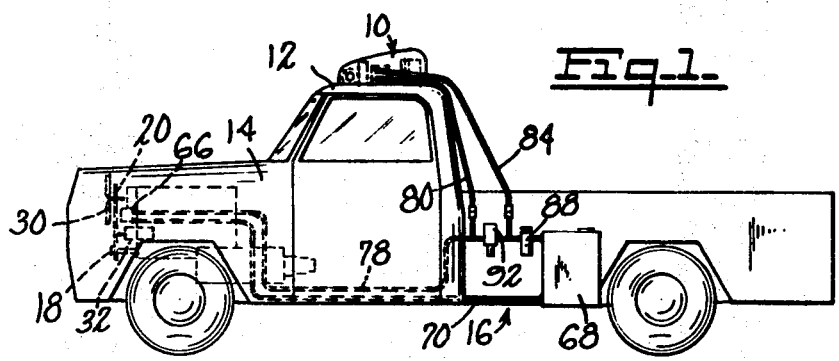
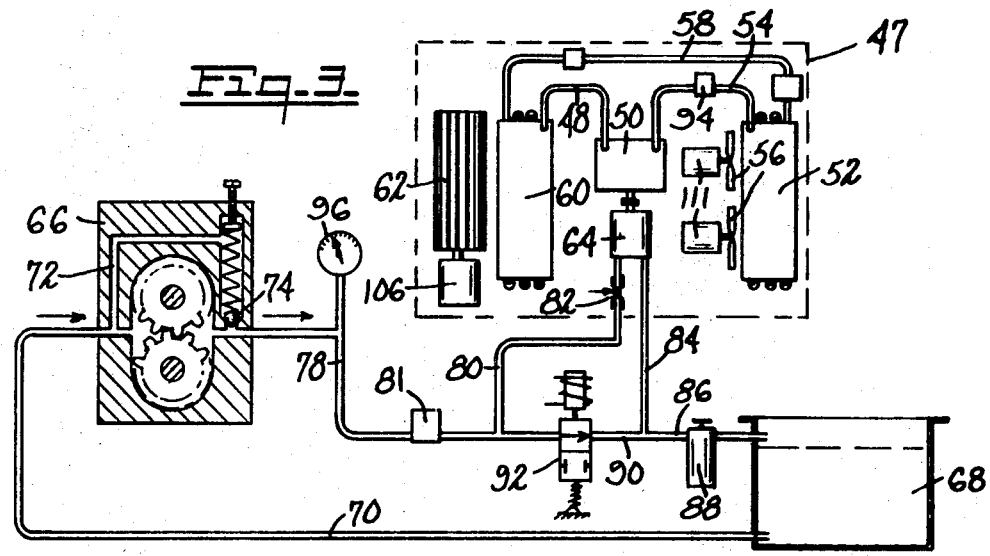
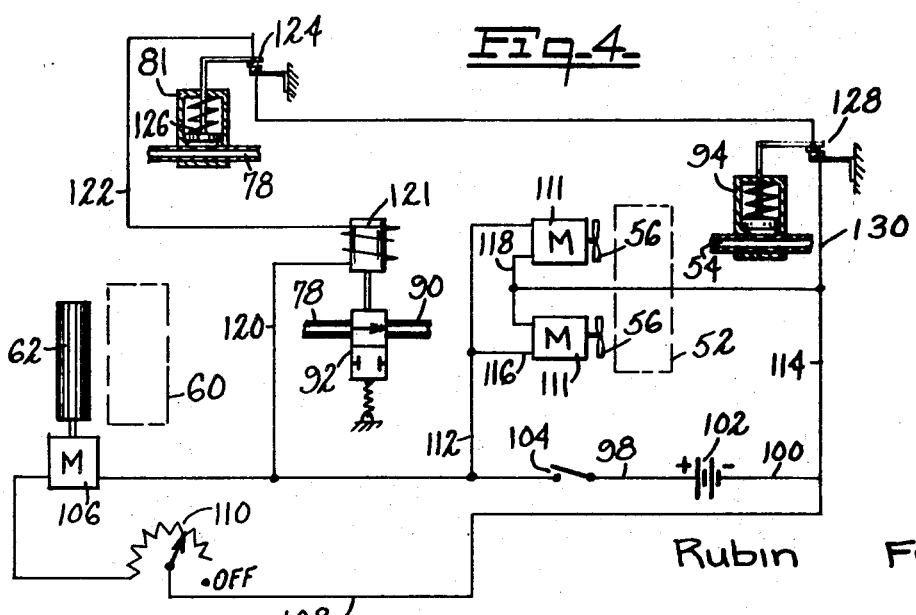
INVENTOR
Rubin Figa
BY DeLio and Montgomery
ATTORNEYS

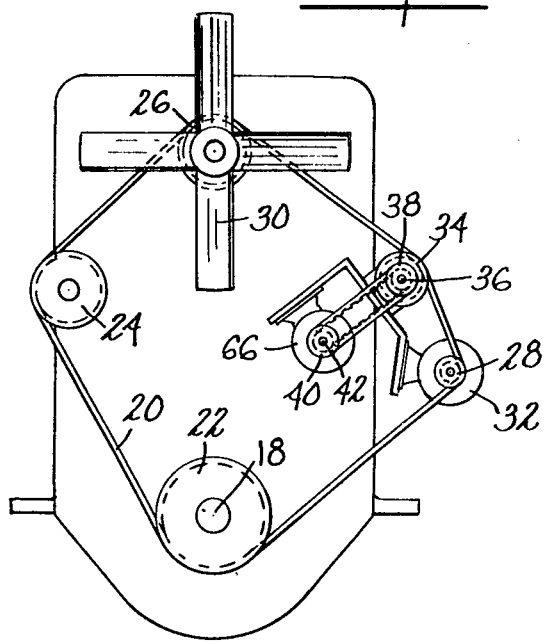
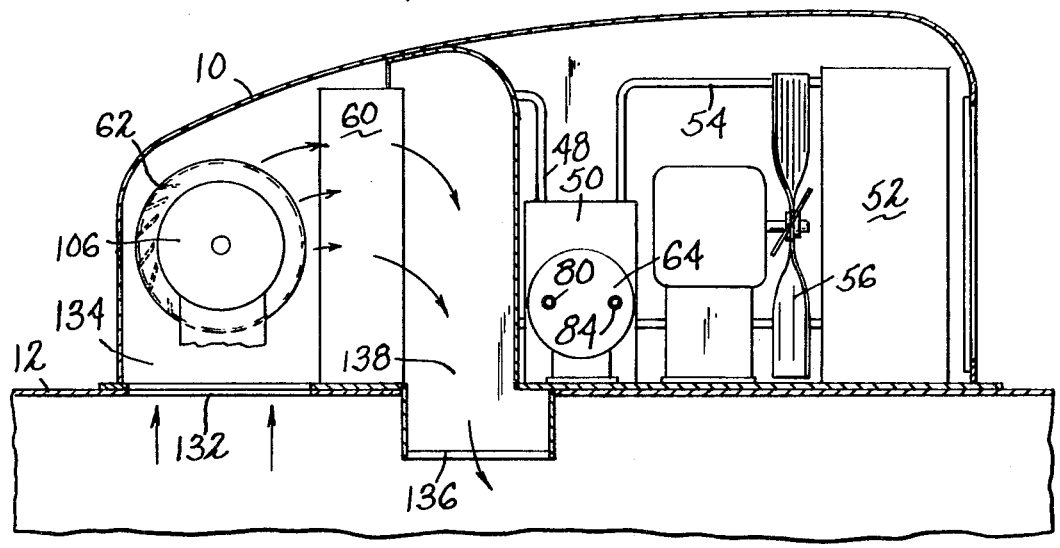

REFRIGERATION APPARATUS FOR AUTOMOTIVE VEHICLES

The present invention relates to refrigeration apparatus for motor vehicles and in particular to a refrigeration apparatus wherein the compressor is operated at a constant rate.

Refrigeration systems for motor vehicles have become increasingly common in recent years. Almost all such systems employ a compressor which compresses the refrigeration gas to a high degree. The compressed gas is then passed to a condenser and cooled, so as to change it into a liquid. The liquid is then passed to an evaporator so that it can extract heat from warm air passing about the evaporator which causes the liquid to return to the gaseous state. In such systems it is possible to drive the compressor from the motive power means of the motor vehicle so that the refrigeration system operates as economically as possible. However, in such a case, the compressor is driven at variable speeds thus causing wide fluctuations in the resultant cooling effected by the refrigeration system. In such refrigeration systems overcooling results when the motor is being driven at high rates of speed and undercooling results when the motor is operated at low rates of speed. Further, such variable operation of the compressor and other components of the refrigerating system produces excessive strains on the components of such system, thus requiring frequent repair and replacement of parts. In addition, the excessive pressures produced in the compressor increase the probability that the compressor might explode and injure the driver. As a result, refrigeration systems have been devised to drive the compressor at a constant rate. However, all such systems utilize complicated hydraulic components such as variable displacement hydraulic pumps, servo valves, and the like, for driving the compressor at a constant rate. Further, these systems utilize excessively complicated means for disabling the operation of the compressor in the case of excessive pressure buildups, etc.

In view of the foregoing it is an object of the present invention to provide new refrigeration apparatus for motor vehicles wherein the compressor is operated at constant rate by employing a constant displacement hydraulic motor and variable speed hydraulic pump.

Another object of the present invention is to provide new refrigeration apparatus for motor vehicles wherein a simple valve and bypass means is provided to maintain the fluid flow rate output of a variable speed hydraulic pump at a relatively constant level.

It is still another object of the present invention to provide new refrigeration apparatus for motor vehicles wherein valve means are located in the hydraulic system such that when the valve means is opened the constant displacement hydraulic motor that drives the compressor is deactivated.

It is yet another object of the present invention to provide new refrigeration apparatus for motor vehicles wherein cog belt means are provided to efficiently drive a variable speed hydraulic pump from the main fan belt of the vehicle motive power system.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

Accordingly the above and other objects are accomplished by the refrigeration system of the present invention which comprises a compressor for providing a compressed refrigeration gas to a condenser. The refrigeration gas is liquified and the resulting liquid is passed to an evaporator which cools the warm air. The compressor is driven by a constant displacement hydraulic motor which is powered by hydraulic fluid pumped by a variable speed hydraulic pump from a reservoir. The hydraulic pump is driven directly from the motive power means of the motor vehicle. A first bypass conduit means having a pressure responsive valve therein is located between the outlet and inlet sides of the pump. When the pressure at the outlet side of the pump exceeds a predetermined value, the valve progressively opens to allow fluid to bypass from the outlet side to the inlet side of the pump, maintaining the net fluid flow rate from the pump at a substantially constant level. Further, second bypass conduit means with solenoid valve means located therein are provided between the inlet and outlet sides of the hydraulic motor. When the solenoid valve means is opened the fluid from the hydraulic pump bypasses the hydraulic motor and flows to the reservoir so as to deactivate the hydraulic motor. Pressure responsive means may also be provided in the hydraulic line connecting the outlet side of said hydraulic pump to the inlet side of said hydraulic motor. Pressure responsive means may also be provided at the outlet side of the compressor. When the fluid pressure at these points exceeds a certain predetermined value, the solenoid valve opens to deactivate the hydraulic motor.

For a fuller understanding of the nature and objects of the invention, reference is had to the following description taken in connection with the accompanying drawings, in which:

FIG. 1 is a side elevational view of a motor vehicle with the refrigeration apparatus of the present invention mounted thereon;

FIG. 2 is a schematic view of the main fan belt drive of the motor vehicle showing the hydraulic pump and drive for same;

FIG. 3 is a schematic block diagram of the hydraulic system according to a preferred embodiment of the present invention;

FIG. 4 is a schematic block diagram of the electrical circuit according to a preferred embodiment of the present invention, and FIG. 5 is a cross-sectional view of part of the refrigeration apparatus of the present invention.

Referring now to FIG. 1, the main elements of the refrigeration apparatus are positioned in a frame box 10 mounted on the roof 12 of a motor vehicle 14. The hydraulic system that drives the elements in frame box 10 is mounted on the frame of the vehicle 14 as generally shown at 16. In FIG. 2 the main drive shaft 18 of the motive power means of the motor vehicle drives a fan belt 20 through a V-pulley 22. Fan belt 20 drives an idler pulley 24, a fan pulley 26 and a generator pulley 28 so as to drive motor cooling fan 30 and generator 32. Fan belt 22 also drives a V-pulley 34 to rotate a shaft 36 and a gear pulley 38 thereon. Gear pulley 38 drives a gear pulley 40 on a shaft 42 of a variable speed hydraulic pump 66 by means of a cog belt 46 which connects the gear pulleys 38 and 40. Gear pulleys 38 and 40 and cog belt 46 eliminate slippage in the drive so that fan belt 20 will rotate shaft 42 of pump 44 at substantially the same rate as the speed of main drive shaft 18.

FIG. 3 shows the refrigeration system of the preferred embodiment in schematic block diagram form wherein the components that are located in frame box 10 is indicated by dotted lines 47. Refrigeration gas passes through line 48 into a compressor 50 wherein it is compressed to a substantially higher pressure. The highly pressurized gas is then passed into a condenser 52 through line 54. Cooling fans 56 are used to force cool air about the condenser so as to cool and condense the compressed gas to a liquid. The liquid is then passed through a line 58 to an evaporator 60 which is maintained at a low pressure. The liquid passed to evaporator 60 is evaporated by warm air forced by blower 62 against the evaporator. The warm air releases heat to the liquid in evaporator 60 and is cooled thereby. The resulting warm refrigerator gas in evaporator 60 is then passed back to compressor 50 through line 48 and the refrigeration cycle is repeated.

A hydraulic motor 64 which is a constant displacement motor receives a constant supply of fluid from a hydraulic pump 66. As a result, motor 64 drives compressor 50 at a constant speed. Hydraulic pump 66 is a constant displacement variable speed hydraulic pump wherein the drive shaft 42 of the pump is preferably driven in the manner shown in FIG. 1.

Hydraulic pump 66 draws hydraulic fluid from a reservoir 68 through line 70. Reservoir 68 is open to the atmosphere so that gasses formed due to evaporation of the hydraulic fluid will escape therefrom and not be pumped through the hydraulic system. A bypass conduit 72 is located between the inlet and outlet sides of pump 66. A pressure responsive valve 74 is positioned in conduit 72 adjacent the outlet side of pump 66. Valve 74 will progressively open as the fluid pressure at the outlet side of pump 66 increases above a predetermined value. A simple spring biased ball valve may be used as shown although more complicated and accurate valves may also be used. Pump 66 forces hydraulic motor 64. A pressure responsive device 81 is located in line 78 whose operation will be explained below. A manually operated valve 82 is located in line 80 so as to limit the maximum amount of fluid that can pass into motor 64. Valve 82 is unnecessary if the inlet opening of motor 64 is sufficiently small to accommodate only the desired maximum flow rate of fluid through said motor. However, a more versatile apparatus is obtained if valve 82 is used to set the maximum fluid flow rate to motor 64 as will be explained below. The hydraulic fluid passes through motor 64 and lines 84 and 86 back to reservoir 68. A filter 88 is located in line 86 to filter out any impurities that may pass into the hydraulic fluid while it flows through the hydraulic system. As a result, these impurities do not accumulate sufficiently to interfere with the operation of the system. A bypass line 90 connects lines 78 and 86 and has a solenoid valve 92 therein. Further, line 54 contains pressure responsive device 94. A pressure indicating means 96, which includes a gauge, is connected to line 78 to continually provide the operator of the vehicle with an indication of the pressure therein. The operation of pressure-responsive devices 81 and 94 in cooperation with solenoid valve 92 will be more fully explained below.

In the operation of the hydraulic system, a hydraulic pump 66 is provided that will pump 5, 6 or more gallons of hydraulic fluid per minute when the motor of the vehicle is set at idling. Valve 82 is then adjusted so that the maximum fluid flow rate into motor 64 will be the same as the output from pump 66 at idling. As has been mentioned previously, the inlet opening to motor 64 may be such that it can only accommodate maximum flow rates of 5, 6 gallons, etc. In the preferred embodiment described above a motor 64 with a large inlet opening is used and valve 82 is provided to limit the maximum fluid flow rate into the motor. Since motor 64 is set to receive a maximum fluid flow rate at idling, when the motor of the vehicle increases in speed, a pressure buildup in lines 78 and 80 will result. The pressure buildup causes valve 74 to progressively open so that excess hydraulic fluid above 5 or 6 gallons per minute, as the case may be, is bypassed through conduit 72 back to the inlet side of hydraulic pump 66. In this manner the net fluid flow rate output of hydraulic pump 66 is maintained at the value produced at idling speed. If for any reason valve 74 jams into a closed position, the pressure in line 78 will increase beyond the desirable safety limit. In that case solenoid valve 92 is deenergized to open bypass line 90 so that hydraulic fluid may flow directly to reservoir 68, thus deactivating motor 64.

The electric circuit operating solenoid valve 92 and pressure sensitive devices 81, 94 is shown in FIG. 4. Electric lines 98 and 100 lead from a main battery source 102. A manual switch 104 is located in line 98 for breaking or opening the entire circuit and is maintained in an open position when the motor vehicle is not in operation. An electric motor 106 which operates blower 62 is connected to lines 98. Line 108 connects motor 106 to line 100 so as to complete the circuit. A manually adjustable resistor 110 is located in line 108 for regulating the power input to motor 106 and thus regulating the speed of blower 62. The electric motors 111 that drive fans 56 are connected by means of lines 112, 114 to lines 98 and 100 to the circuit of blower 62 in a parallel circuit. Motors 111 are connected in parallel circuit to each other with respect to lines 112 and 114 through lines 116 and 118. A third parallel circuit comprises line 120 connected to line 98 so as to energize a coil 121 of solenoid valve 92. A line 122 connects coil 121 in series with a switch 124. Pressure-responsive device 81 located in fluid line 78 opens and closes switch 124. Pressure-responsive device 81 may be any type of device such as the one shown in FIG. 4. Such a device may comprise a spring biased plunger 126 which is moved upwards when the pressure on line 78 exceeds a certain predetermined value to open switch 124 so as to break the circuit. Switch 124 is connected in series to a switch 128 by means of a line 130. Switch 128 is acted upon by pressure responsive device 94 located in line 54. This pressure responsive device may be similar in construction and operation to device 81. A line 130 connected to line 114 completes the series circuit to line 100. In the operation of the refrigeration apparatus when the motor vehicle operator manually closes master switch 104 all the circuits are energized to operate blower 62 and fans 56. Further, solenoid valve 92 is energized to close the valve and cause hydraulic fluid to be pumped through hydraulic motor 64. If the fluid pressure in lines 78 and 54 exceeds for any reason predetermined safety limits, pressure devices 81 and 94 will break the solenoid circuit to open the solenoid valve and deactivate motor 64. Further, if for any reason pressure responsive devices 81, 94 fail to operate, the driver can notice the pressure increase on pressure indicating means 96 and manually open switch 104 to break the solenoid circuit, thus disabling motor 64 and relieving the pressure in lines 54, 78.

FIG. 5 shows a preferred form of box frame 10 wherein the main components of the refrigeration apparatus are mounted as explained previously. In particular the opening 132 of inlet duct 134 through which the warm air is drawn in by blower 62 is preferably at least 3 inches above the opening 136 of outlet duct 138 from which passes the cooled air. By this arrangement of the openings of inlet and outlet ducts 132, 138 only a negligible amount of cooled air from duct 138 is drawn back through duct 132 since the cooled air tends to settle below the warm air.

It may thus be seen that the present refrigeration apparatus provides many advantages over other refrigeration apparatus which operate the refrigeration compressor at a constant rate. In particular, the present hydraulic system for operating the compressor is constructed from simple parts which are more efficient in operation. Further, the electric circuit which controls the hydraulic system is more simple and less expensive than the circuitry in comparable refrigeration units. Further, the present apparatus has all the safety features of the prior art apparatus, while eliminating complicated and undesirable mechanisms.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A refrigeration system for a motor vehicle adapted to be operated by the prime mover of said vehicle where the system includes a condenser and evaporator connected in operative relation with a compressor, comprising a hydraulic motor for driving the compressor, a constant displacement hydraulic pump driven by the prime mover, a hydraulic fluid reservoir, a conduit connecting said pump and said conduit in a serial loop, a valve disposed in said conduit loop, inlet and outlet lines connecting said hydraulic motor to said conduit on either side of said valve with the inlet line connected on the higher pressure side of said valve, said valve being normally closed to fluid flow during operation of said system to direct fluid to said hydraulic motor, and pressure responsive means in said conduit on the high pressure side of said pump adapted to open said valve and pass fluid from said pump to said reservoir bypassing said hydraulic motor.

2. The system of claim 1 wherein said valve is solenoid operated, a source of electric energy and switch means controlled by said pressure-responsive means arranged to connect and disconnect the solenoid to the source of electric energy.

3. The system of claim 1 further including a second pressure-responsive means connected between the compressor and condenser, said second pressure-responsive means being constructed and arranged to open said valve if the pressure on the output side of said compressor reaches a predetermined level.

4. The system of claim 3, further including a source of electric energy, a solenoid for operating said valve, and first and second switch contacts operated by said first and second pressure responsive means, respectively, said source of electric energy and said solenoid being operatively arranged in electrical circuit with said first and second contacts.

5. The system of claim 1 wherein the evaporator, compressor, condenser and hydraulic motor are mounted on a housing member adapted to be mounted on the roof of the vehicle, a blower for said evaporator and at least one fan for said condenser, an opening defined in said housing member for drawing warm air past the evaporator, a second opening in said housing member for passing cool air therefrom, said first opening being a substantial distance above said second opening.

6. A refrigeration system for a motor vehicle adapted to be operated by the prime mover of said vehicle where the vehicle includes accessory devices driven by a pulley and belt from the prime mover and the refrigeration system includes a condenser and evaporator connected in operative relation with a compressor and a hydraulic motor for driving the compressor, a constant displacement hydraulic pump, a hydraulic fluid reservoir a conduit connecting said pump and said conduit in a serial loop, a valve disposed in said conduit loop, inlet and outlet lines connecting said hydraulic motor to said conduit loop on either side of said valve with the inlet line connected on the higher pressure side of said valve, said valve being arranged to direct fluid to said motor from said pump and bypass fluid about said motor to said reservoir, a pulley system including a first pulley engaging the belt, a second timing pulley nonrotatably joined to said first pulley, a third timing pulley on the shaft of said pump, and a timing pulley belt about said second and third pulleys to drive said pump.

7. The system of claim 6 wherein said valve is solenoid operated and is normally set to direct fluid to said hydraulic motor when said system is in operation.

8. The system of claim 7 wherein said pressure-response means operates switch contacts in circuit with the solenoid.

9. In a refrigeration system for a motor vehicle adapted to be operated by the prime mover of said vehicle where the vehicle includes accessory devices driven by a pulley and belt from the prime mover and the refrigeration system includes a condenser and evaporator connected in operative relation with a compressor and a hydraulic motor for driving the compressor, a constant displacement hydraulic pump, a hydraulic fluid reservoir, a conduit connecting said pump and said conduit in a serial loop, a pulley system for driving the pump including a first pulley engaging the belt, a second timing pulley nonrotatably joined to said first pulley, a third timing pulley on the shaft of said pump, and a timing pulley belt about said second and third pulleys to drive said pump.

PO-1050
(5/69)

UNITED STATES PATENT OFFICE
CERTIFICATE OF CORRECTION

Patent No. 3,603,105                    Dated September 7, 1971

Inventor(s) Rubin Figa

It is certified that error appears in the above-identified patent and that said Letters Patent are hereby corrected as shown below:

Column 3, line 12, after "hydraulic" insert --fluid through lines 78 and 80 to the inlet side of hydraulic--.

Claim 6, line 4, insert a comma after "reservoir".

Signed and sealed this 11th day of April 1972.

(SEAL)
Attest:

EDWARD M. FLETCHER, JR.
Attesting Officer

ROBERT GOTTSCHALK
Commissioner of Patents